Patented Mar. 25, 1952

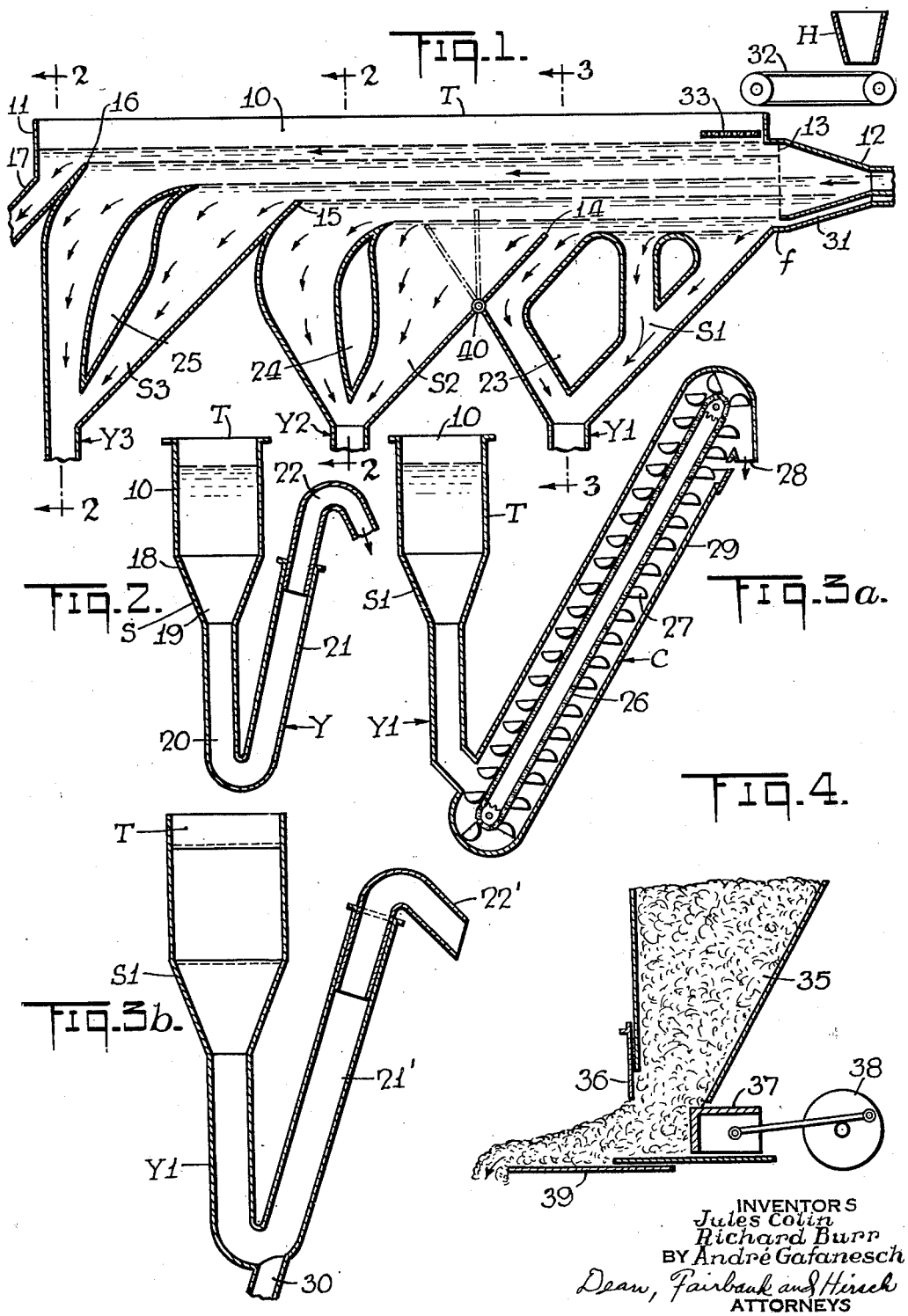

2,590,756

UNITED STATES PATENT OFFICE 2,590,756

ART OF MINERAL SEPARATION

Jules Colin, Richard Burr, and André Gafanesch, Mulhouse, France, assignors to Mines Domaniales de Potasse d'Alsace, Mulhouse, Haut Rhin, France, a corporation of France Application March 19, 1947, Serial No. 735,568
In France May 10, 1946

17 Claims. (Cl. 209—173)

The present invention is more especially concerned with, though not limited to, the separation or classification by the "float-sink" method, that is in a liquor having intermediate density, and is especially applicable where the particles to be separated have nearly equal density.

Where, as is generally the case, the mass to be classified by the "float-sink" method comprises individual particles made up of various proportions of the slightly denser and the slightly less dense components, the eddy currents engendered in agitation of the mass in a relatively deep bath may cause large portions of those of such composite particles which are of intermediate density, either to sink with the denser particles or to rise with the less dense particles, thereby greatly to impair the efficacy of classification.

Where the material to be classified also includes friable particles of higher density, which it is desired to segregate as effectively as feasible from those of densities closely adjacent to each other and which are to be classified, agitation in a relatively deep bath would cause further disturbance in the efficacy of classification, due to the disintegration of such heavier particles and entrainment thereof with either or both of the groups of particles to be segregated.

It is accordingly among the objects of the invention to provide a continuous method and equipment for performing the same, for classification of the foregoing type, by which the gravity separation is effected without the use of paddles or agitators and without any mechanical disturbance that would give rise to eddy currents and therefore to considerable entrainment of composite particles of intermediate density by either the lighter or the heavier particles to be classified, or of minute particles resulting from mechanical disintegration of denser schist or the like.

While the invention is applicable to a wide range of uses especially for mineral separation, it finds a particularly important application in the separation of the ore known as "sylvinite," especially sylvinite of the character obtained from the potassium mines of Mulhouse in France. Such sylvinite ore includes a substantial component of potassium chloride (KCl) and of sodium chloride (NaCl) admixed with schist which is friable and largely of clay of density higher than that of the salts. The salts mentioned differ from each other but slightly in density, the KCl having a specific gravity of 1.97 and the NaCl of 2.15.

In practice, the ore would of course be broken up prior to the separation process into small particles generally of maximum dimension in the order of 2 millimeters. These particles, as will be readily understood, will differ widely in specific gravity, some being largely of clay and heaviest, others largely of potassium chloride and lightest, still others having varying proportions of the three primary components of sodium chloride, potassium chloride and clay, the density or specific gravity of the particles thus extending throughout the range from 1.97 up to 2.80 or higher.

While the salt particles will not markedly disintegrate in the salt-saturated bath in which the classification is to be conducted, the clay component would powder fairly readily were there to be much agitation in such bath and this would interfere with the classification for reasons pointed out in the foregoing more general treatment.

According to the invention from one important aspect thereof, the bath of intermediate density is a relatively shallow stream advanced forward preferably horizontally at uniform speed throughout its cross section as the ore to be separated is gently laid upon the surface of the stream. The stream is deflected, preferably through a number of courses branching from the main stream, and the inlets of which branches are arranged in sequence along the bottom of the stream, each branch course intercepting all of the liquor in the main stream up to a level higher than the previous branch course and the flow into each of the courses being streamlined for a minimum of agitation so that the entrained particles in the successive courses will be of progressively lower average density, the lightest floating ingredients passing out from the end of the stream above the last of the branch courses.

According to another feature, the propulsion of the stream is effected, desirably by difference of pressure potential between the supply of liquor at one end of the stream and the diverting agency at the various branch courses. Preferably the deflection of liquor out of the main stream and into and through each branch course is effected by a siphoning action to draw off all liquor from the bottom up to successively higher levels of the inlets to the consecutive branch courses. The siphoning arrangement accordingly not only constitutes or contributes to the propulsion of the main stream but is the effective agency for drawing each of the various fractions from out of the main stream into and through the branch streams.

According to the invention from another aspect thereof, friable particles or components heavier than the more valuable constituents to be classified are in large measure promptly gravitated out of the bath near the inlet of the shallow stream, and removed therefrom with a minimum of agitation and therefore with a minimum of breaking up of such heavier friable particles and with the avoidance therefore of the adverse consequences above pointed out. To assure prompt separation of the heaviest components without propelling the classification stream at a speed too high to permit effective gravitational separation of the lighter particles, a mechanical elevator such as a bucket chain, or a hydraulic means such as an auxiliary stream of heavy liquid propelled upward through the bottom of the first branch stream promotes the effective removal of the heavy particles.

According to the invention from another aspect thereof, there is passed into the stream at its inlet and near the bottom thereof a liquor of high density which forms a horizontal curtain to block the descent at that region of the lighter particles to be classified, but permits penetration therethrough of the relatively heavy particles to be initially removed from the bath.

In the particular application of the method for the classification of sylvinite ore, it will be understood that it is the heavy schist which will be first diverted from the stream near the inlet end thereof and removed and there would be in addition, one, two or more successive deflection siphons or the like to withdraw successively lighter fractions having progressively greater proportions of potassium chloride, while the most valuable and lightest component, largely of potassium chloride, would be discharged from the farthest end of the stream or bath.

While the method may be carried out with any of a variety of equipment, it comprises preferably a shallow elongated rectangular tank through the entire area of one end of which the liquor is introduced, a sequence of preferably funnel-shaped sumps defining the bottom of the tank, the far wall of each sump extending to a level in the bath higher than that of the previous sump, and serving as a weir, each sump being preferably connected to adjustable liquid propelling means, preferably an adjustable siphon, and each sump being of internal structure to promote streamlined flow with minimum of agitation.

In the accompanying drawings in which are shown one or more of various possible embodiments of the several features of the invention, Fig. 1 is a schematic view in longitudinal cross section through one embodiment of the invention, Fig. 2 is a view in transverse cross section, taken on line 2—2 of Fig. 1, and on a smaller scale, Fig. 3ª is a view in transverse cross section, taken on line 3—3 of Fig. 1, and on the same scale as Fig. 2, Fig. 3ᵇ is a view in transverse cross section of an alternative embodiment, also taken on line 3—3 of Fig. 1 on somewhat larger scale than Fig. 2, and Fig. 4 is a detailed view on a larger scale of a modification of the feed of ore to the bath shown in Fig. 1.

Referring now to the drawings, the preferred equipment comprises a generally rectangular, relatively shallow tank T having side walls 10, an end wall 11 and having an inlet for the liquor at its other end, said inlet preferably diverging as at 12 to a mouth 13 of the area of the end of the tank, as shown.

The shallow tank is conformed with a sequence of sumps illustratively three in number, S1, S2 and S3, each preferably of funnel shape, the mouths or tops of the sequence of sumps preferably occupying the entire length of the tank and each being of width equal to the entire width of the tank. The advance walls of the successive sumps, that is that wall of each sump which is farthest from the inlet end 13 of the tank, extend to progressively higher levels proceeding lengthwise of the tank. The top of wall 14 is at lowest level, preferably nearly flush with the bottom of the tank proper that extends above the sumps, the top of wall 15 to somewhat higher level and the top of sump wall 16 to still higher level. The advanced wall of each sump preferably defines a common sharp edge, as shown, with the inlet side of the succeeding sump. Beyond the advance edge 16 of the last sump S3 is the outlet pipe 17, illustratively through the bottom of the tank at the outlet extremity of the latter.

Each sump at its upper portion is in the shape of the frustum of a rectangular pyramid, the lateral walls 18 tapering toward each other and the front and rear walls 19 having a similar taper. To the lower or outlet end of each frusto-conical sump is applied a means for propelling the liquid downward and outward. That means may be a suction device or any other appropriate liquid propulsion device but is preferably a siphon, such as shown at Y¹, Y² and Y³ in the drawings. That siphon may consist of a downward pipe 20 unitary and coaxial with the conical sump S and in effect constituting part of the sump, with a reversely bent upturned tubular arm 21 having a reversely turned goose-neck 22 from which the siphon discharge occurs. The goose neck is preferably a separate elbow-piece slidably adjustable in the upper end of tube 21 to facilitate adjustment in the maximum level of the tank to which the siphon operates. The siphon functions as a constant-level device and of course any equivalent known expedient for such constant level action could be used although the siphon is preferred.

Preferably curvilinear fixed streamlining structures such as 23, 24 and 25 are built into the respective sumps as shown, and these are effective for assuring smooth flow of the liquor with a minimum of turbulence or eddy currents.

In applications in which there is a relatively heavy component in the ore, that will promptly settle by gravitation and that has a tendency to collect in the first sump, it is preferred to utilize in association with or instead of the upturned arm of the siphon, an elevator or conveyor C diagrammatically shown in Fig. 3ª and comprising an endless belt 26 with a sequence of buckets 27 thereon moving in a clockwise direction as shown, and lifting the solid content collecting in the buckets and discharging the same through exit 28 near the upper end of the conveyor casing 29.

As an alternative to the mechanical elevator of Fig. 3ª, resort may be had to the hydraulic elevator shown in Fig. 3ᵇ. To this end the upturned siphon arm 21' has an inlet 30 at the lower or elbow thereof to which is introduced under pressure a suitable heavy liquor which will entrain the relatively heavy particles deposited into the first sump S1 and will remove these through the outlet 22' as rapidly as the same settle in the bottom of the sump and will prevent any possible clogging.

The equipment also includes a channel or tube 31, preferably immediately below the flaring inlet 12, said channel extending preferably the entire width of the tank. That channel serves for introducing into the bath and laying along the bottom of the tank proper and above the first sump S1, a thin layer of relatively heavy liquor which will serve largely to block the downward flow of the lighter particles in the mass to be classified.

To introduce the sub-divided ore into the bath for purposes of separation, the equipment involves a suitable arrangement which preferably lays the ore down gently upon the top of the bath near the inlet end 13 thereof, without causing turbulence or eddy currents. As diagrammatically shown in Fig. 1, this means may comprise a hopper H from which the material drops upon an endless conveyor belt 32 therebelow, from the delivery end of which it in turn drops upon a grid or screen 33 that extends transversely of the inlet end of the tank T substantially at the upper level of the stream, said grid being vibrated by suitable means (not shown), across the width of the tank to cause the material to drop through the apertures thereof for uniform distribution across the entire width of the tank directly below.

In Fig. 4 is shown an alternative arrangement for introducing the sub-divided ore upon the liquid. In that arrangement the hopper 35 has a gate 36 directly above the liquor through which the mass is expelled horizontally by means of a plunger 37 reciprocated through a short stroke by a rotating eccentric 38, so that it will pass off the forward edge of a plate 39 directly over the bath. The plate 39 is preferably arranged to be adjustable longitudinally of the bath so as to lengthen or shorten the course lengthwise of the bath of the particles to be classified.

It will be understood that the specific disclosure of siphon is only schematic and that equivalent means for adjusting the effective height thereof may be resorted to. For instance, the outer or upturned siphon arm 21 might be hinged by suitable bellows (not shown) to the fixed arm 20 to adjust the inclination and corresponding height of its outlet end or said upturned arm 21 might have a plurality of ports (not shown) at different levels therealong which may be selectively opened.

In an illustrative application of equipment particularly useful for treating sylvinite ore, the effective height of liquid in the tank, that is the height from floor f to the top level of the liquid, as shown in Fig. 1, may be in the order of 20 centimeters, and the level of liquor above the top of weir 16 may be in the order of 4 centimeters. The length of the tank from the inlet 13 to the outlet wall 11 might be about 1.4 meters. Liquid medium is propelled lengthwise of the tank at such rate that no particle introduced into the tank stays therein for more than twenty seconds. In order words, the siphons or other propulsive devices are so adjusted that the combined feed thereof, added to that of discharge duct 17, propels the main stream at the desired rate noted. The ratio by volume of solid ore to liquid medium introduced into the right end of the equipment, as shown in Fig. 1, is preferably approximately 1 to 4.

In the operation of the equipment described for the classification of sylvinite ore, the siphons Y would be set at such height that any liquid that has not previously left the tank therethrough will leave through the outlet port 17 about twenty seconds after it has been admitted through the inlet end 13. The sub-divided ore being gently laid upon the liquor near the inlet end of the tank by the equipment shown in Fig. 1 or that shown in Fig. 4, will be propelled forward with the liquid stream in the tank and during such propulsion the heaviest schist component will promptly settle in considerable part into sump S1 where it is pocketed and from which it will be promptly taken out of the system either by the elevator C of Fig. 3ª or the hydraulic elevator of Fig. 3ᵇ in manner previously described. Heavy liquor passed along the bottom of the tank T, through channel 31 and above the sump S, will act as a screen or curtain to prevent excessive quantities of the lighter potassium and sodium salts from being entrained with the schist. That liquor through channel 31 may have a density of 2.20 and illustratively a liter thereof may contain .754 liters of mother liquor or salt saturated water having in suspension therein 1,272 kilograms of magnetite.

By the time any cross section of the liquid stream has travelled with its entrained particles from the inlet 13 to the weir 14 at the far side of the first sump S, the lighter particles will have floated, to be largely above said weir, the heaviest schist as above noted being removed through the sump S1, the liquid that passes above the weir 14 will be of density lower than that of the schist and higher than that passing above the still higher weir 15, and not pocketed in sump S2, which in turn is higher than that which passes over the final and highest weir 16 near the outlet end 11 of the tank. Finally the lightest or floating component largely of potassium chloride, at level above the highest weir 16 will be discharged through the outlet tube 17.

In operation, the liquid medium feeds forward or lengthwise of the tank at rate which is practically uniform throughout the entire height of the shallow tank, so that there is little or no eddy current tending to interfere with the natural separation of the lighter particles floating to the top and with the heavier particles dropping to the bottom. The liquor with its contained solid is peeled off as it were from the bottom of the tank by the outlet or weir end of each sum and in such peeling off the direction of flow of the liquid is changed so gradually by reason of the streamlined formations within the sumps that eddy currents are largely avoided and there is precluded the powdering or comminution of such of the heavier, friable particles, such as particles of schist as had not been removed through the first of the sumps S1.

The weir wall 14 of the first sump S is preferably adjustable in position as by hinging at 40 so as to permit a widening or narrowing of the effective area of the sump mouth between the limits suggested in full and dotted lines in Fig. 1 of the drawings, thereby to permit adjustment in accordance with the character and proportion of schist contained in the ore. It will be understood that the number of sumps used and the relative height of their weirs may vary to suit requirements.

In a typical run of sylvinite, using the equipment described, the grain size would be between 2 and 20 millimeters and the schist and anhydride component of specific gravity of 2.18 to 2.80 (as compared with that of sodium chloride at 2.15 and potassium chloride at 1.97). The separating medium would preferably be a solution of water saturated with sodium chloride and potassium chloride at ambient temperature and brought to a specific gravity of slightly greater than 2.0, that is intermediate between the specific gravities of the potassium chloride and sodium chloride to be separated, by adding thereto magnetite in amount sufficient for the desired density of liquor and so finely subdivided as to maintain a fairly stable suspension. The magnetite will be in sufficiently stable suspension if 45 per cent of its mass will pass through a mesh screen with openings of .05 millimeter.

In a typical run, the operation may be tabularly indicated as follows:

| Place (Fig. 1) | Medium | |
| --- | --- | --- |
| | Feed in liters per second | Density |
| 1. At the inlet, i. e. at 13 | 2,800 | 2.120 |
| 2. At the exit 17 with the floated discharge | 560 | 2.080 |
| 3. From the final sump, i. e. at Y3 | 1,020 | 2.120 |
| 4. From the intermediate sump, i. e. at Y2 | 1,020 | 2.140 |
| 5. At the first sump, i. e. at Y1 | 200 | 2.160 |

The equipment will treat 2530 metric kilograms of sylvinite per hour.

The composition of the various fractions delivered from a typical bath of sylvinite ore with the equipment described is as follows:

| Fraction | Per cent KCL | Per cent K$_2$O | Per cent NaCl | Per cent Insolubles | Per cent weight in kilos | Per cent weight in percentage | Proportion in percentage of the total amount of KCl contained in the feed |
| --- | --- | --- | --- | --- | --- | --- | --- |
| Feed | 26.5 | 16.7 | 61.7 | 11.8 | 2530 | 100 | |
| Floating fraction (through 17) | 82.0 | 51.8 | 14.7 | 3.3 | 500 | 20 | 60 |
| Fraction through sump S3 | 18.0 | 11.4 | 73.0 | 9.0 | 600 | 24 | 16 |
| Fraction through sump S2 | 13.5 | 8.5 | 72.5 | 14.0 | 1090 | 42 | 20 |
| Fraction through sump S1 | 8.7 | 5.5 | 49.9 | 41.4 | 340 | 14 | 4 |

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. The method of classifying particle differing little in density, which comprises releasing the mass of particles for gentle deposit thereof substantially upon the surface of a liquor of density intermediate between that of the heavier and that of the lighter particles, advancing the entire height of the liquid horizontally and rectilinearly in a stream at substantially uniform rate until gravity separation between the particles has largely occurred, the heavier particles sinking and the lighter ones remaining floating and in the course of the horizontal movement of the liquor with its entrained particles and at successive stages of said movement deflecting successive layers of the liquor, each with its entrained particles in a downward direction.

2. The method of classifying particles differing little in density, which comprises releasing the particles for gentle deposit thereof upon the surface of a liquor of density intermediate between that of the heavier and that of the lighter particles, advancing the entire height of the liquor horizontally and rectilinearly in a stream at substantially uniform rate until gravity separation between the particles has largely occurred and in the course of the horizontal movement of the liquor with its entrained particles, intercepting and deflecting in a downward direction the lowermost layer of the entire width of the liquor stream at one stage of its horizontal flow and at progressively later stages of stream flow successively intercepting and deflecting in a downward direction the liquor below progressively higher levels, the segregated fractions carrying particles of successively lower average density.

3. The method of classifying solid particles of different density, which comprises constantly propelling forward at uniform rate throughout the entire height thereof, a shallow stream of liquor of intermediate density, releasing the particles to be separated for gentle deposit thereof upon the moving stream, and at each of successive points in the movement of the stream, intercepting and deflecting in a downward direction the entire width of the then lowermost portion of the stream, the successive segregated portions extending to successively higher levels in the stream, the successive segregated portions carrying particles of successively lower average density.

4. The method recited in claim 3 in which the stream is propelled by siphoning the same from various points along the length of the stream and in which the successive siphoning operations are applied up to successively higher levels of the stream and serve to segregate entrained particles of different average ranges of density.

5. The method of classifying mixtures of particles, differing little in density, which consists in introducing the particles into a stream of liquid having a density intermediate those of said particles, applying suction concurrently to various portions of substantially the length of the stream spaced at successively greater distances along the stream and in each case from the bottom thereof up to successively greater heights in the stream, for constant forward propulsion of the stream, while maintaining the same in communication with a source of supply, thereby substantially separating through the various suction actions, and removing from the stream by the respective suction applications materials of different average density.

6. The method recited in claim 5 in which the suction is effected by a siphoning operation.

7. The method recited in claim 5 in which liquid is pocketed below the stream at successive portions of the length thereof, the successively pocketed portions extending to progressively higher levels in the stream and in which each pocketed fraction of liquid is siphoned off for continuous operation.

8. The method recited in claim 6 in which relatively heavy liquor is injected into the lower part of a siphon near the inlet end of the stream and in direction to expel the contents therefrom.

9. A separator comprising a shallow tank having a liquor inlet at one end thereof and having a sequence of sumps thereunder, successive sumps having progressively higher walls at the respective ends thereof more remote from the inlet, the mouths of the sequence of sumps occupying substantially the entire length and width of the tank, each sump having associated therewith suction means for propelling the liquor and for withdrawing the intercepted liquor therefrom.

10. The combination recited in claim 9 in which each sump is generally funnel shaped.

11. Separating equipment comprising an elongated shallow tank, means for delivering liquor thereinto from one end thereof, means for depositing the particles to be separated upon said liquor near said end, a sequence of sumps protruding downward from the tank, the mouths of the sequence of sumps occupying substantially the entire length and width of the tank, said sumps extending to progressively higher levels in the tank, an elevator connected to the bottom of the first sump for withdrawal of the heaviest particles that drop into the latter and suction means connected to the bottom of the remaining sumps to effect propulsion of the liquor with entrained particles and to withdraw the corresponding fractions from the stream.

12. The combination recited in claim 11 in which the suction means are siphons.

13. The combination recited in claim 11 in which each siphon is adjustable in the height of its outlet arm.

14. The combination recited in claim 11 in which the particles to be separated are deposited upon the stream in the tank by a reciprocating screen and in which a belt conveyor deposits the particles upon the screen.

15. Separating equipment comprising an elongated shallow tank having a main inlet of substantially the height and width of the end wall of said tank, a sequence of funnel shaped sumps extending under and constituting the floor of said tank, the successive sumps beginning with that nearest the inlet extending to successively greater height in said tank, and a narrow inlet across the width of the tank for admission of heavy liquor from immediately below the main inlet to form a thin layer for blocking downward flow of lighter particles.

16. Separating equipment comprising an elongated shallow tank, means for delivering liquor thereinto from one end thereof, means for depositing the particles to be separated upon said liquor near said end, a sequence of sumps protruding downward from the tank, the mouths of the sequence of sumps occupying substantially the entire length and width of the tank, said sumps extending to progressively higher levels in the tank, and suction means connected to the lower ends of the several sumps to effect concurrent propulsion of the liquor with its entrained particles and withdrawal of the corresponding fractions from the stream.

17. Separating equipment comprising an elongated shallow tank, means for delivering thereinto a liquor comprising a liquid carrier having suspended therein minute insoluble particles that impart to the liquor a specific gravity intermediate between that of particles to be separated, means for gently depositing upon the surface of the liquor near one end of the tank the particles to be separated, a sequence of sumps protruding downward from the tank the mouths of the sequence of sumps occupying substantially the entire length and width of the tank, said sumps extending to progressively higher levels in the tank, suction means to effect propulsion of the liquor with entrained particles from the lower parts of the sumps and to withdraw the corresponding fractions from the stream, and one or more streamlined bodies in each of said sumps extending the major part of the height thereof and serving to minimize turbulence to increase the linear speed of discharge through the sumps and to preclude the settling of the suspended matter that constitutes a component of the liquor.

JULES COLIN.
RICHARD BURR.
ANDRÉ GAFANESCH.

REFERENCES CITED

The following references are of record in the file of this patent:

UNITED STATES PATENTS

| Number | Name | Date |
| --- | --- | --- |
| 206,115 | Jebb | July 16, 1878 |
| 873,951 | Langerfeld | Dec. 17, 1907 |
| 1,169,292 | Smith | Jan. 25, 1916 |
| 1,646,506 | Velten | Oct. 25, 1927 |
| 1,811,408 | Stebbins | June 23, 1931 |
| 1,835,634 | Chapman | Dec. 8, 1931 |
| 2,062,626 | Williams | Dec. 1, 1936 |
| 2,138,825 | Allen | Dec. 6, 1938 |
| 2,150,946 | Smith | Mar. 21, 1939 |
| 2,165,152 | Pruss | July 4, 1939 |
| 2,202,418 | Foulke | May 28, 1940 |
| 2,209,618 | Vogel | July 30, 1940 |
| 2,262,465 | Olney | Nov. 11, 1941 |
| 2,365,734 | Tromp | Dec. 26, 1944 |
| 2,429,925 | Clifford | Oct. 28, 1947 |
| 2,458,035 | Tromp | Jan. 4, 1949 |
| 2,460,802 | Bitzer | Feb. 8, 1949 |
| 2,482,747 | Davis et al. | Sept. 27, 1949 |

FOREIGN PATENTS

| Number | Country | Date |
| --- | --- | --- |
| 215,521 | Great Britain | May 15, 1924 |
| 708,269 | France | Apr. 28, 1931 |
| 451,402 | Great Britain | Aug. 5, 1936 |
| 361,215 | Italy | July 15, 1938 |
| 839,777 | France | Jan. 7, 1939 |
| 55,945 | Netherlands | Mar. 15, 1944 |